US012577940B2

(12) United States Patent
Dikty

(10) Patent No.:   US 12,577,940 B2
(45) Date of Patent:       Mar. 17, 2026

(54) SEGMENT AND SYSTEM FOR A SCRUTON HELIX, SCRUTON HELIX, TOWER AND METHOD FOR MOUNTING A SCRUTON HELIX

(71) Applicant: Nordex Energy SE & Co. KG, Hamburg (DE)

(72) Inventor: Dorothea Dikty, Luebeck (DE)

(73) Assignee: Nordex Energy SE & Co. KG, Hamburg (DE)

( * ) Notice: Subject to any disclaimer, the term of this patent is extended or adjusted under 35 U.S.C. 154(b) by 568 days.

(21) Appl. No.: 18/066,532

(22) Filed: Dec. 15, 2022

(65) Prior Publication Data

US 2023/0193878 A1      Jun. 22, 2023

(30) Foreign Application Priority Data

Dec. 22, 2021    (DE) ..................... 10 2021 134 258.9

(51) Int. Cl.
| | |
|---|---|
| *F03D 13/20* | (2016.01) |
| *B29C 49/00* | (2006.01) |
| *B29C 49/20* | (2006.01) |
| *F03D 13/10* | (2016.01) |
| *F03D 80/80* | (2016.01) |

(52) U.S. Cl.
CPC .......... *F03D 13/20* (2016.05); *B29C 49/0031* (2013.01); *B29C 49/20* (2013.01); *F03D 13/10* (2016.05); *F03D 80/88* (2016.05); *B29C 2049/2008* (2013.01); *B29C 2049/2034* (2013.01); *F05B 2240/912* (2013.01); *F05B 2260/964* (2013.01)

(58) Field of Classification Search
CPC ......... E04H 12/20; F03D 80/88; F03D 13/10; F03D 13/20
See application file for complete search history.

(56) References Cited

U.S. PATENT DOCUMENTS

| | | | | | |
|---|---|---|---|---|---|
| 8,770,894 | B1* | 7/2014 | Allen | ...................... | E21B 17/01 |
| | | | | | 405/211.1 |
| 10,865,910 | B1* | 12/2020 | Allen | ........................ | F15D 1/10 |
| 2007/0231077 | A1* | 10/2007 | Burgess | .................. | E21B 17/01 |
| | | | | | 405/216 |
| 2015/0082743 | A1* | 3/2015 | Moeller | .................. | E04H 12/28 |
| | | | | | 52/857 |
| 2016/0160499 | A1* | 6/2016 | Moeller | .................. | F03D 13/20 |
| | | | | | 52/698 |
| 2016/0312761 | A1 | 10/2016 | Moeller et al. | | |
| 2022/0316448 | A1* | 10/2022 | Osorio Martinez | .... | F03D 13/40 |

FOREIGN PATENT DOCUMENTS

| | | |
|---|---|---|
| CN | 104454392 A | 3/2015 |
| CN | 105927479 A | 9/2016 |
| DE | 20 2018 003 615 U1 | 8/2018 |

(Continued)

*Primary Examiner* — Christine T Cajilig
(74) *Attorney, Agent, or Firm* — Walter Ottesen, P.A.

(57)        ABSTRACT

A segment for a Scruton helix includes: a segment body, a coupling device on the segment body for coupling the segment to a further segment for the Scruton helix, a push-on device on the segment body for coupling the segment to a rope. Also disclosed are a system for a Scruton helix, a Scruton helix, a tower for a wind turbine, and a method for mounting a Scruton helix.

17 Claims, 4 Drawing Sheets

(56)           References Cited

FOREIGN PATENT DOCUMENTS

| | | | | | |
|---|---|---|---|---|---|
| DE | 10 2018 118 965 | A1 | | 2/2020 | |
| EP | 2 851 490 | A1 | | 3/2015 | |
| EP | 3 029 313 | A1 | | 6/2016 | |
| EP | 3 604 715 | A1 | | 2/2020 | |
| EP | 3604801 | A1 | * | 2/2020 | ............. F03D 80/00 |
| EP | 3 754 183 | A1 | | 12/2020 | |
| EP | 3604801 | B1 | * | 9/2021 | ............. F03D 13/40 |
| WO | WO-2009070483 | A1 | * | 6/2009 | ................ F16L 1/00 |

* cited by examiner

SEGMENT AND SYSTEM FOR A SCRUTON HELIX, SCRUTON HELIX, TOWER AND METHOD FOR MOUNTING A SCRUTON HELIX

CROSS-REFERENCE TO RELATED APPLICATIONS

This application claims priority of German patent application no. 10 2021 134 258.9, filed Dec. 22, 2021, the entire content of which is incorporated herein by reference.

TECHNICAL FIELD

The disclosure relates to a segment for a Scruton helix, in particular a Scruton helix for a tower of a wind turbine. Furthermore, the disclosure relates to a system for a Scruton helix, in particular having a segment described herein. Furthermore, the disclosure relates to a Scruton helix, in particular a Scruton helix for a tower of a wind turbine. Furthermore, the disclosure relates to a tower for a wind turbine, in particular a tower having a Scruton helix described herein. The disclosure additionally relates to a method for mounting a Scruton helix.

BACKGROUND

A wind turbine has a rotor via which wind energy can be converted into a driving torque that can drive a generator via a drive train. The drive train, generator and other components may be mounted in a nacelle positioned on a tower. In particular during the assembling of the wind turbine, while the nacelle is not yet mounted on the tower, the tower can be set into unwanted oscillation, for example by wind.

SUMMARY

It is desirable to disclose a segment for a Scruton helix that enables easy and reliable mounting. It is also desirable to disclose a system for a Scruton helix that enables easy and reliable mounting. It is also desirable to disclose a Scruton helix that enables easy and reliable mounting. It is also desirable to disclose a tower for a wind turbine in which unwanted oscillations are easily and reliably reduced. It is also desirable to disclose a method for mounting a Scruton helix that can be performed easily and reliably.

According to an embodiment, a segment for a Scruton helix has a segment body. The segment has a coupling device on the segment body. The coupling device serves to couple the segment to a further segment for the Scruton helix. The further segment is in particular identical in construction to the segment. The segment has a push-on device on the segment body. The push-on device serves to couple the segment to a rope/cable.

Via a Scruton helix, it is possible to prevent oscillations that are excited, for example by wind, during the assembling of the wind turbine while the nacelle is not yet mounted on the tower. For example, a Scruton helix is temporarily mounted on the tower of a wind turbine via a system during the assembling of the wind turbine.

In particular, the segment is configured to be used as part of the Scruton helix for a tower of a wind turbine. The segment can be produced and transported easily and at low cost. At the site of use, the segment can be easily and reliably coupled to the rope to form the Scruton helix. Coupling to segments can be achieved easily and reliably via the coupling device, for example by connecting the segment in a non-positive and/or positive manner to the further segment. Thus, the segment enables the Scruton helix to be mounted quickly and easily. Demounting is also easily achievable, for example because the segment can be pulled off the rope. The segment may be configured to be of low weight.

The production method, for example a hollow blow molding process, enables the segment to be produced at low cost. The segment is reusable and can be used on a multiplicity of wind turbines during the assembling operation.

The Scruton helix serves to damp vortex-excited transverse oscillations during the assembling and construction of the wind turbine. The segment is configured, as part of the Scruton helix, to disturb currents that may occur at the cylindrical tower. For example, for this purpose the segment has a triangular, T-shaped, rectangular or semicircular cross-section. Other shapes are also possible. For example, the segment has the shape of a prism.

According to at least one embodiment, the push-on device has a projecting region. The projecting region is configured to hook behind the rope. Thus, the segment can be attached to the rope via the projecting region, and unwanted detachment or slipping from the rope can be avoided.

According to at least one embodiment, the projecting region at least partially surrounds a rope channel. The rope channel is configured to receive the rope when in a mounted state, such that the segment can be shifted along the rope. This enables the segment to be fitted-on at any point along the rope. Even when in the mounted state, the segment can be shifted along the rope and can thus be brought to a desired location on the rope.

According to at least one embodiment, the push-on device has an access region. The access region allows the segment to be applied to and removed from the rope. For example, the access region is arranged adjacent to the projecting region and enables the segment to be applied to the rope at any point along the rope. The rope can be brought through the access region to the rope channel. The segment may also be removed from the rope at any point on the rope, in that the rope is removed from the segment, out of the rope channel, through the access region.

According to at least one embodiment, the rope channel has a direction of main extent. The access region has a direction of main extent. The direction of main extent of the rope channel and the direction of main extent of the access region include an angle of greater than 0°. The direction of main extent of the rope channel and the direction of main extent of the access region are not aligned co-directionally, but substantially transversely to each other, for example at an angle of between 70° and 110° to each other, in particular 90°+/−5°. This enables, for example, the rope to be easily inserted through the access region and the rope to be subsequently arranged in the rope channel. The different alignment of the directions of main extent prevents the rope from coming out of the rope channel, through the access region and out of the segment.

For the purpose of mounting the segment, the segment can be placed on the rope through the access region, for example, and subsequently rotated such that the rope channel is pushed onto the rope and the direction of main extent of the rope channel coincides with a direction of longitudinal extent of the rope. The direction of main extent of the access region then differs sufficiently from the direction of longitudinal extent of the rope so as to prevent the rope from unwantedly coming out of the segment.

Instead of coupling the segment to the rope via rotation, other relative movements between the segment and the rope are also alternatively or additionally possible. For example, the segment is pushed linearly onto the rope, transversely with respect to the direction of longitudinal extent of the rope, and is thus connected to the rope without any additional rotation.

According to at least one embodiment, the segment body has a support surface. The support surface serves to support the segment on a base, for example the wall of the tower of the wind turbine. The push-on device has a region that is recessed relative to the support surface. The recessed region partially forms the rope channel. The recessed region partially forms the access region. The segment can thus be reliably supported on the base and held via the rope.

According to at least one embodiment, the coupling device has a projection and a recess. The projection is insertable into a recess of a further, in particular similarly constructed segment for the purpose of coupling the segment to the further segment. In particular, the projection is arranged on a first transverse side of the segment, and the recess is arranged on an opposite transverse side of the segment. The projection and the recess have mutually corresponding outer shapes, such that the projection is insertable into the recess of the further segment.

For example, the outer shapes of the projection and the recess are each configured to prevent twisting of the segment relative to the further segment via the projection and the recess when coupled. For example, the projection and the recess each have a triangular shape, a quadrilateral shape, or another shape that can prevent rotation of the segment and the further segment relative to each other. According to further embodiments, the outer shapes of the projection and the recess are each configured to allow twisting of the segment relative to the further segment.

In particular, the outer shape is configured such that the segment can be tilted relative to the further segment to such an extent that the Scruton helix formed with the segments can be placed around the tower.

The segment body is, for example, a blow-molded hollow plastic body or comprises a blow-molded hollow plastic body. Thus, the segment can be produced at low cost with a comparatively low weight.

According to an embodiment, a system for a Scruton helix comprises a rope. The system comprises a plurality of the segments described herein. The segments can each be coupled to the rope. The segments can each be coupled to each other. The system is reusable on a multiplicity of wind turbines and can be easily mounted as a Scruton helix and demounted.

According to an embodiment, a Scruton helix comprises a system described herein. The segments of the system are coupled to the rope. Directly adjacent segments are coupled to each other. The segments are fitted onto the rope and held by the rope. The segments are coupled to each other via the respective coupling devices, such that the Scruton helix is formed from the individual segments.

According to an embodiment, a tower for a wind turbine comprises a Scruton helix described herein. The Scruton helix is arranged in the form of a spiral around the tower. The Scruton helix can be easily produced from the segments and the rope, and can be flexibly mounted on the tower. It is also possible, for example, for individual segments to be removed from the rope arranged spirally on the tower and replaced. The Scruton helix damps transverse oscillations of the tower.

According to an embodiment, a method for mounting a Scruton helix comprises providing a segment described herein and a rope. The segment is fitted onto the rope. The segment is rotated relative to the rope and thereby coupled to the rope. By being fitted-on and rotated, the segment can be easily and flexibly coupled to the rope. In particular, the segment can be coupled to the rope at any point along the rope.

According to at least one embodiment, the method comprises providing at least one further segment described herein. For example, a plurality of the segments described herein are provided. The further segment is fitted onto the rope. The further segment is rotated relative to the rope and thereby coupled to the rope. The segment and the further segment are shifted relative to each other along the rope. When having been coupled to the rope, the segment and the further segment are coupled to each other. Thus, as a result of being fitted-on and rotated, and subsequently shifted, the segment and the further segment are coupled both to the rope and to each other.

BRIEF DESCRIPTION OF DRAWINGS

The invention will now be described with reference to the drawings wherein:

FIG. 2 shows a schematic representation of a segment and a rope according to an embodiment;

DETAILED DESCRIPTION

Figure 1:
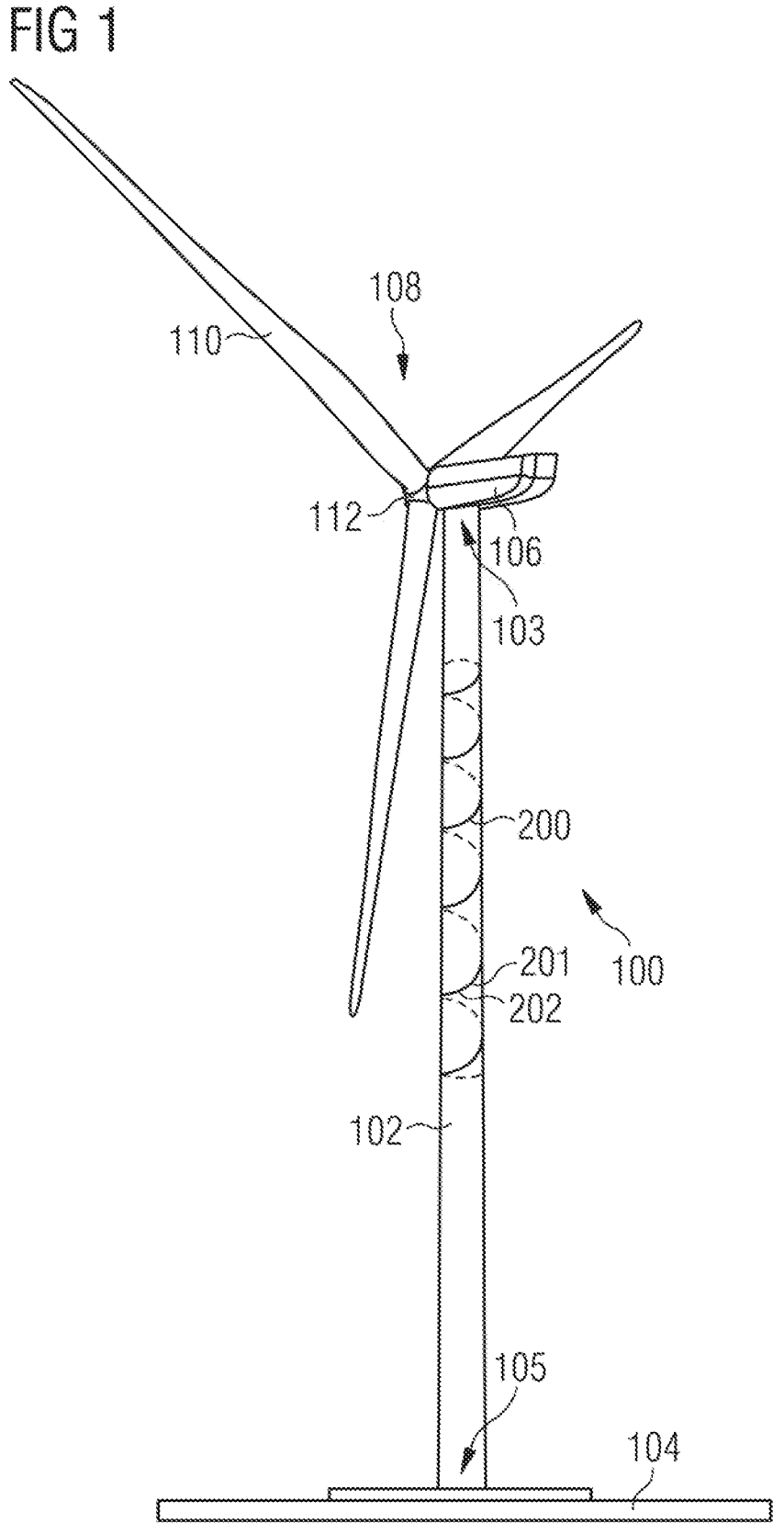
FIG. 1 shows a schematic representation of a wind turbine according to an embodiment.

FIG. 1 shows a schematic representation of a wind turbine 100 according to an embodiment. The wind turbine 100 has a tower 102. The tower 102 is fixed to a base at one end 105 of the tower 102 via a foundation 104. At an end 103 of the tower 102 that is opposite to the base there is a rotatably mounted nacelle 106. The nacelle 106 comprises, for example, a generator coupled to a rotor 108 via a drive train. The drive train comprises, for example, a rotor shaft, a gearbox, a clutch, a rotor brake and other components (not explicitly represented). The rotor 108 comprises, for example, one or more rotor blades 110 arranged on a rotor hub 112. The rotor hub 112, in turn, is connected to the rotor shaft.

In particular during the assembling of the wind turbine 100, for example before the nacelle 106 is attached to the end 103 of the tower 102 or before the rotor 108 is mounted on the rotor hub 112, transverse oscillations may occur at the tower 102 due to air currents. In order to damp such vortex-excited transverse oscillations, there is a Scruton helix 200 attached to the tower. The Scruton helix is then removed in particular after the assembling of the wind turbine 100 has been completed, for example after the nacelle 106 has been arranged at the end 103 of the tower 102 and after the rotor 108 has been mounted.

The Scruton helix 200 surrounds the tower 102 in the form of a spiral. Along the longitudinal direction of the tower 102, the Scruton helix 200 is arranged, for example, all along the tower 102 or along only part of it. For example, the Scruton helix 200 is arranged in a region that faces toward the first end 103 of the tower 102, where there is greater excitation of transverse oscillations. The Scruton helix extends, for example, over at least a quarter of the length of the tower 102, over at least half of the tower 102, or over at least two-thirds of the tower 102. Other extents of the Scruton helix 200 are also possible. The Scruton helix 200 may be composed of one strake or a plurality of strakes, with a plurality of strakes each having the same structure according to the present disclosure.

As will also be explained in more detail below in conjunction with FIGS. 2 to 4, the Scruton helix 200 is formed from a plurality of segments 201, 202.

Figure 2:
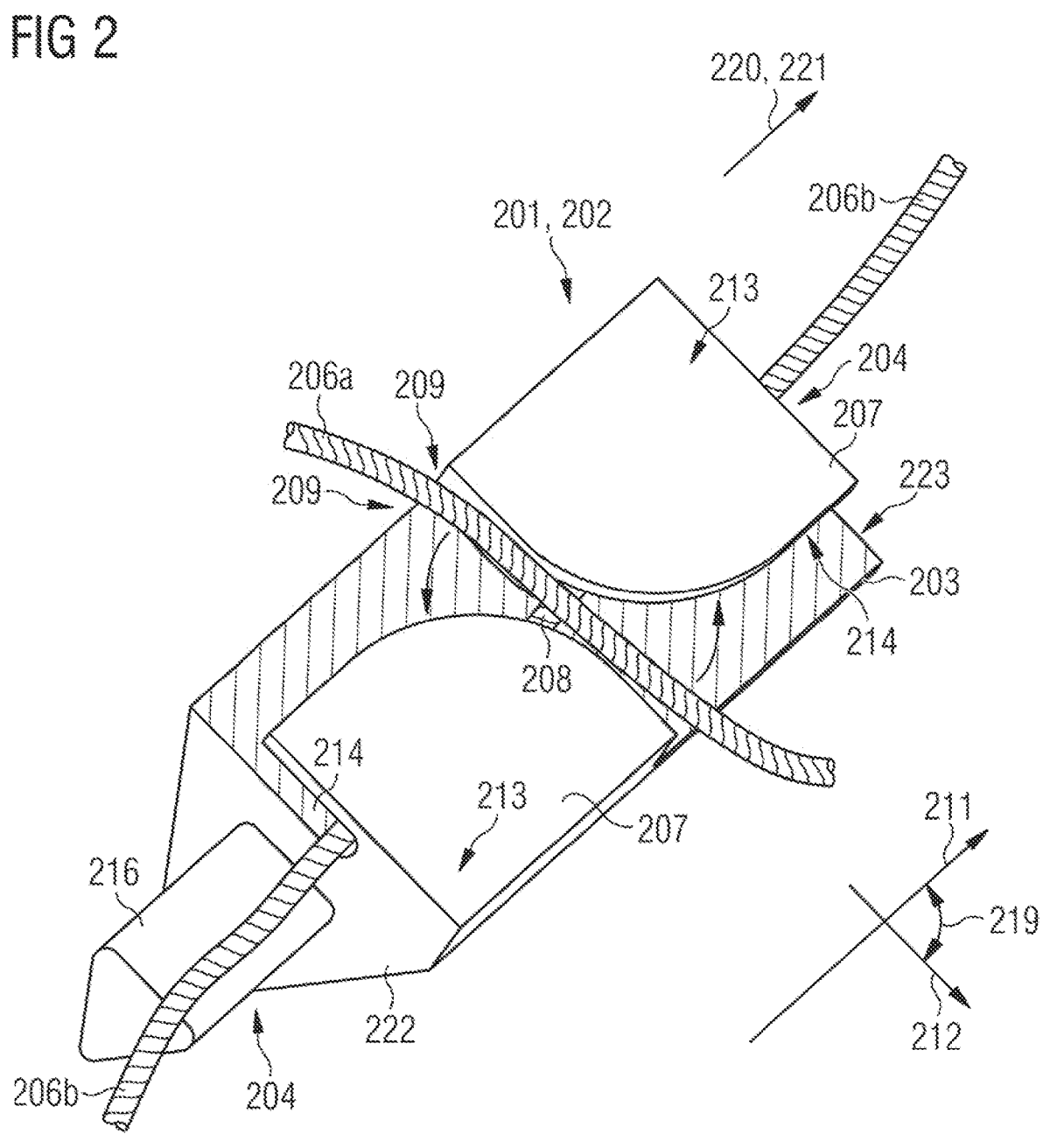

FIG. 2 shows a schematic representation of a segment 201, 202. The segments 201, 202 of the Scruton helix 200 are in particular structurally identical. In the following, therefore, the individual features of the segments 201, 202 may also be explained with regard only to the segment 201.

The segment 201 is in particular made of plastic. For example, the segment 201 is produced via blow molding with thermoplastic materials having a small wall thickness. Thus, a segment body 203 is realized. The segment 201 has, for example, a length, along a longitudinal direction 221 of the segment 201, of 0.5 meters or 0.6 meters to 2 meters, in particular a length of 1.0 meter to 1.5 meters. The segment 201 has, for example, a height, transverse to the longitudinal direction 221 of the segment 201, of 0.3 meters to 1 meter, in particular a height of 0.5 meters to 0.75 meters, for example 0.6 meters.

There is a coupling device 204 realized on the segment body 203. The coupling device 204 serves to couple the segment 201 to at least one further segment 201, 202. In particular, along a direction of longitudinal extent 221 of the segment body 203, the segment 201 can be coupled, on a first side 222, to a further segment 202 and can also be coupled, on an opposite, second side 223, to a further segment 202.

In the embodiment represented, the coupling device 204 has a projection 216. The projection 216 is realized on the first side 222. As can also be seen in particular from FIG. 3, the coupling device 204 has a recess 217. The recess 217 is realized on the second side 223. The projection 216 of the segment 201 is insertable into the recess 217 of the further segment 202 in order to realize the connection between the two segments 201, 202.

The projection 216 and the recess 217 are of mutually corresponding shapes, such that the push-on connection can be formed. According to embodiments, the shape of the projection 216 and the shape of the recess 217 are configured so as to avoid twisting of the two segments 201, 202 relative to each other about the direction of longitudinal extent 221. The projection 216 is configured, for example, in the form of a prism. For example, the projection 216 has a polygonal shape, such as a triangular shape, a quadrilateral shape or any other shape that prevents twisting. According to further embodiments, the projection 216 and the recess 217 have shapes that allow relative twisting with respect to each other. Twisting of the segments 201, 202 relative to each other is prevented, for example, by the support on the tower 102.

The cross-section of the projection 216 transversely with respect to the direction of longitudinal extent 221 is in particular smaller than the cross-section of the main segment body 203 transversely with respect to the direction of longitudinal extent 221. The cross-section of the projection 216 transversely with respect to the direction of longitudinal extent 221 is in particular centric in relation to the cross-section of the main segment body 203 transversely with respect to the direction of longitudinal extent 221.

In particular, the projection 216 and the recess 217 are shaped such that the segment 201 can be tilted relative to the further segment 202 to such an extent that the Scruton helix 200 formed with the segments 201, 202 can be placed around the tower 102.

The segment body 203 has a push-on device 205. The push-on device 205 serves to couple and connect the segment 201 to a rope 206. The segment 201 and the further segments 201, 202 are coupled to the rope to realize the Scruton helix 200. The push-on device 205 is configured to couple the segment 201 to the rope 206, not only at an end of the rope 206, but also in any region along the rope 206. The push-on device 205 is configured such that the segment 201 can be applied to the rope 206 in a first orientation. The push-on device 205 is configured such that the segment 201 is rotatable relative to the rope 206, in order to be coupled to the rope 206. When ready for use, the segment 201 has a second orientation relative to the rope 206, in which the direction of longitudinal extent 221 of the segment 201 is in particular co-directional with the direction of longitudinal extent 220 of the rope 206.

The push-on device 205 has a projecting region 207. In the embodiment represented, the projecting region 207 is divided into two sub-regions. There is an access region 209 realized along the direction of longitudinal extent 221 between the two projecting regions 207. The rope 206 can be slid through the access region 209 in the direction of a rope channel 208. Rotation of the segment 201 relative to the rope 206 allows the rope 206 to be brought behind the projecting region 207. The projecting region 207 comprises, for example, a lug 210 (FIG. 4). The lug 210 prevents the rope 206 from unwantedly slipping out of or being released from the coupled state. In the coupled state, the rope 206 is arranged between the projecting region 207 and a recessed region 214 of the segment body 203. Thus, the segment 201 can no longer easily detach from the rope 206.

FIG. 2 shows the segment 201 and the rope 206 in two states. In the first state, the rope 206 is designated as rope 206*a*. In the second state, the rope 206 is designated as rope 206*b*. To mount the segment 201 with the rope 206, the segment 201 is fitted onto the rope in the position 206*a* relative to the rope. Then, the segment 201 is rotated relative to the rope 206, as symbolized by the arrows in FIG. 2. In the mounted state, the segment 201 is then arranged relative to the rope 206 in the position of the rope 206*b*.

Coupling the segment 201 to the rope 206 via rotation allows the segment 201 to be mounted easily and reliably at any point on the rope 206. In order to apply the segment 201 to the rope 206, the rope is applied in the access region 209, in the direction of the recessed region 214. The access region has a first direction of main extent 212 for this purpose. The first direction of main extent 212 is in particular not the same as the direction of longitudinal extent 221 of the segment 201. The direction of main extent 212 of the access region is in particular also different from a direction of main extent 211 of the rope channel 208. In the mounted state 206*b*, the rope is guided in the rope channel 208, inside the segment.

The direction of main extent 211 of the rope channel and the direction of main extent 212 of the access region enclose between them an angle 219. In particular, the angle 219 is greater than 0°, such that the direction of main extent 211 of the rope channel is not co-directional with the direction of main extent 212 of the access region. The angle 219 is, for example, 90°+/−5°. In the coupled state, the direction of main extent 211 of the rope channel 208 is co-directional with the direction of longitudinal extent 220 of the rope 206 and with the direction of longitudinal extent 221 of the segment 201.

The segment is fitted onto the rope with the direction of main extent 211 of the rope channel aligned transversely with respect to the direction of longitudinal extent 220 of the rope 206. The segment 201 is then rotated until the direction of main extent 211 of the rope channel 208 and the direction of longitudinal extent 220 of the rope 206 are co-directional.

Figure 3:
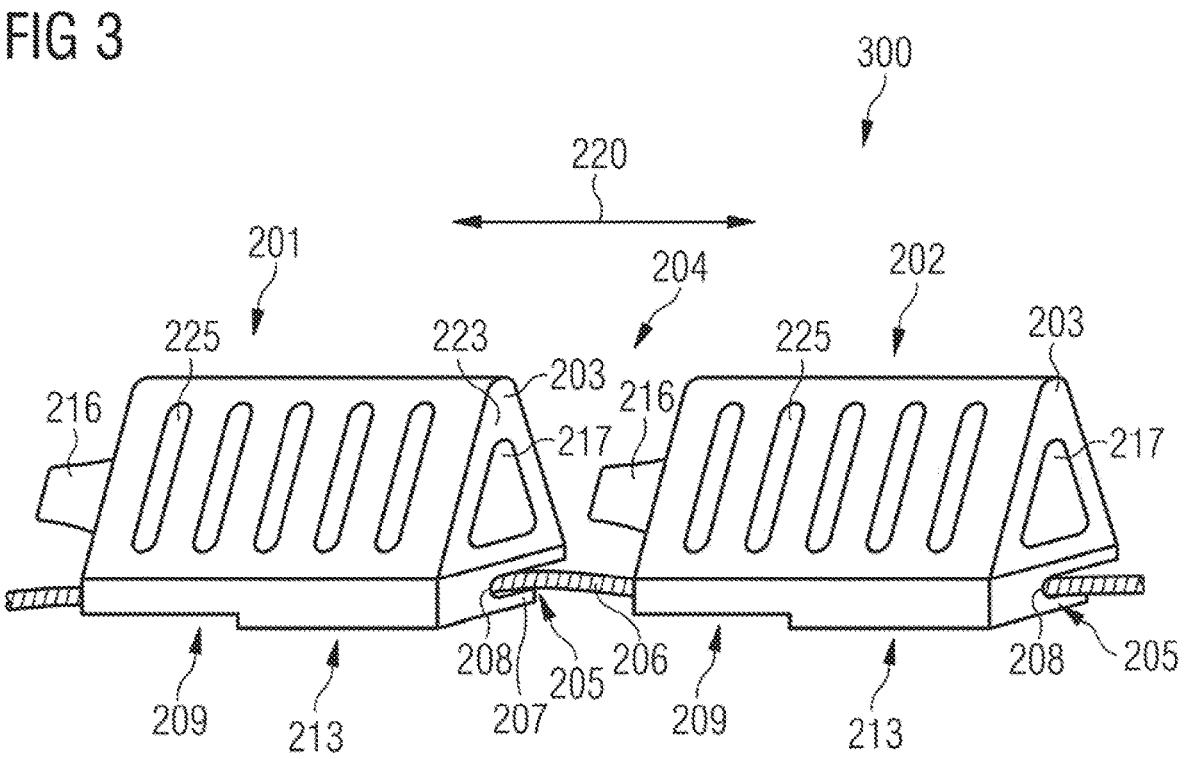
FIG. 3 shows a schematic representation of a system according to an embodiment.

FIG. 3 shows a system 300 for realizing the Scruton helix 200. The system 300 comprises a multiplicity of segments 201, 202, of which two segments 201, 202 are represented in FIG. 3 as an example. The segments 201, 202 are each fitted onto the rope 206 via the associated push-on device 205 and coupled to the rope 206. For the purpose of coupling the segments 201, 202 to each other, the segments 201, 202 are pushed toward each other along the direction of longitudinal extent 220 of the rope 206, such that, for example, the projection 216 of the further segment 202 is inserted into the recess 217 of the segment 201. Thus, the two segments 201, 202 are coupled to each other.

To complete the Scruton helix 200, the individual segments 201, 202 are one by one coupled to the rope 206 via the push-on device 205, and then the respectively directly adjacent segments 201, 202 are connected to each other by the respective coupling devices 204. The respective projections 216 and the respective recesses 217 in this case are configured relative to each other in such a way that there is sufficient play to arrange the segments 201, 202 in the form of a spiral around the tower 102.

FIG. 3 shows reinforcing ribs 225. According to further embodiments, the reinforcing ribs 225 may be omitted. The configuration and the number of reinforcing ribs 225 are predefined depending, for example, on the size and weight of the segment 201. The reinforcing ribs 225 reinforce the walls of the segment 201 and stabilize the segment 201. The reinforcing ribs 225 are formed, for example, from the wall of the segment 201 and are realized during the production of the segment 201. Alternatively or additionally, the reinforcing ribs 225 are separate components that are subsequently attached to the segment, for example by adhesive bonding.

Figure 4:
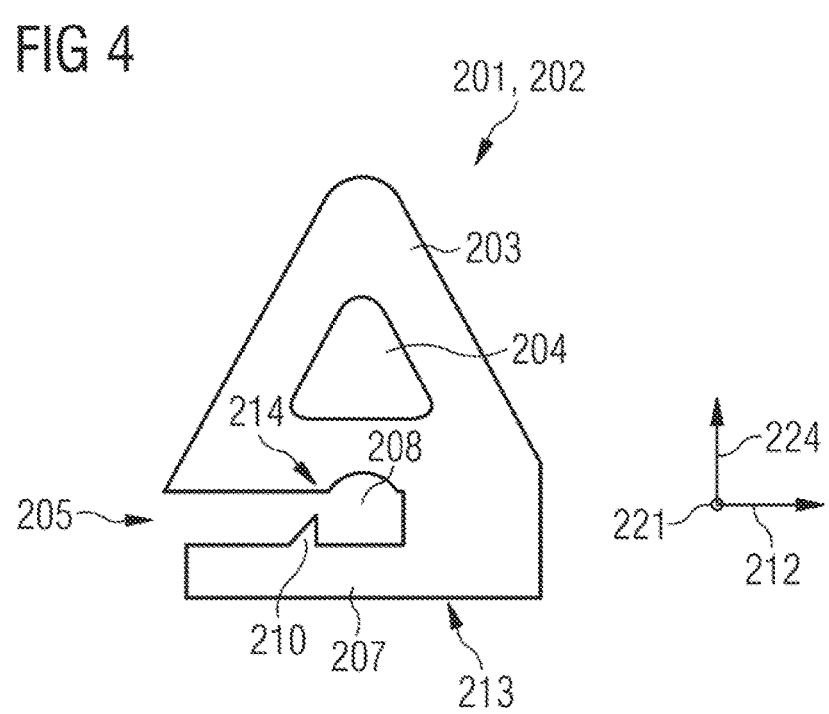
FIG. 4 shows a schematic representation of a sectional view of a segment according to an embodiment; and, FIG. 5 shows a schematic representation of a flow diagram of a method according to an embodiment.

FIG. 4 shows a cross-section of the segment 201, transverse to the direction of longitudinal extent 221 of the segment 201. In the embodiment represented, the segment 201 has a triangular basic shape. Other shapes that can sufficiently suppress the formation of a vortex street are also possible. In particular, the cross-section is configured such that, in the mounted state, there is a support surface 213 realized on a side that faces toward the tower 102.

In the assembled state, the segment 201 is in contact with the tower 102 via the support surface 213. The support surface 213 is realized on the projecting region 207. The rope channel 208, as viewed along a vertical direction 224 of FIG. 4, which is transverse to the direction of main extent 212 of the access region 209 and the direction of longitudinal extent 221 of the segment 201, is arranged between the projecting region 207 and the recessed region 214. Along the direction of main extent 212 of the access region 209, the rope channel 208 is realized adjacent to the lug 210. For the purpose of mounting, the rope 206 must therefore be pushed into the rope channel 208, beyond a slight resistance, over the lug 210. The lug 210 then provides sufficient mechanical resistance to prevent the rope 206 from unwantedly coming out of the rope channel 208.

The cross-sectional shape of the coupling device 204 and of the segment body 203 may be similar, for example each triangular as in the embodiment represented. The two shapes may also differ from each other, such that the segment body 203 has a different cross-sectional shape than the coupling device 204. For example, the coupling device 204 may be realized in the shape of a rectangle, and the segment body 203 may be T-shaped.

The axis of rotation for coupling the segment 201 to the rope 206 is oriented, for example, at an angle of 90° to the direction of longitudinal extent 220 of the rope. For example, the axis of rotation for coupling the segment 201 to the rope 206 is co-directional with the vertical direction 224. In order to be coupled to the rope 206, the segment 201 is rotated about the axis of rotation. The axis of rotation is transverse to the direction of main extent 211 of the rope channel 208 and transverse to the direction of main extent 212 of the access region 209.

Figure 5:
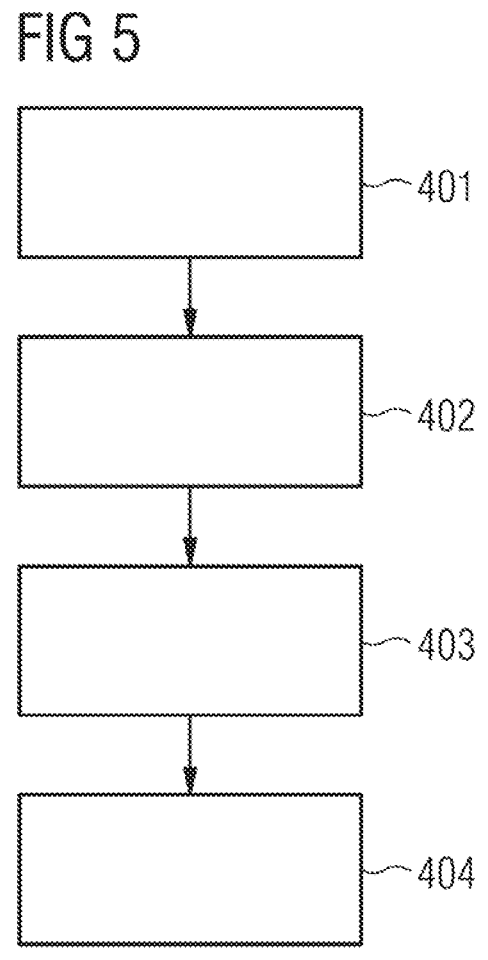

FIG. 5 shows a schematic diagram of a flow diagram of a method for mounting the Scruton helix 200.

In step 401, the segment 201 is provided, or a plurality of segments 201, 202 are provided. In addition, the rope 206 is provided. For example, the rope 206 is wound in the form of a spiral around a horizontally supported section for the tower 102 provided in preparation for mounting, and one end of the rope 206 is appropriately secured to the tower 102.

In step 402, the segment 201 is fitted onto the rope 206, or the segments 201, 202 are each fitted on. The segments 201, 202 are fitted onto the rope in the orientation corresponding to the rope 206a in FIG. 2. The segments 201, 202 are each fitted onto the rope 206 one after the other in an orientation in which the respective direction of main extent 211 of the rope channel 208 differs from the direction of longitudinal extent 220 of the rope 206.

After the segment 201 has been fitted onto the rope 206, in step 403 the segment 201 is rotated relative to the rope 206 and thereby coupled to the rope 206. This corresponds to the orientation represented as rope 206b in FIG. 2. In particular, in order to be coupled to the rope 206, each of the segments 201, 202 is rotated immediately after having been fitted-on. Thus, for example, the segment 201 is first coupled to the rope 206 before the further segment 202 is fitted onto the rope 206.

In step 404, the segment 201 and the further segment 202 arranged immediately adjacent to the segment 201 are then pushed toward each other, relative to each other, along the direction of longitudinal extent 220 of the rope 206 until the projection 216 of one segment 201, 202 engages the recess 217 of the other segment 201, 202 and the push-on connection between the two segments 201, 202 is realized. For example, the two directly adjacent segments 201, 202 are coupled together via the coupling device 204 before a further segment 201 is fitted onto the rope. It is also possible to first fit a plurality of segments 201, 202 onto the rope and then push the segments 201, 202 toward each other, thereby realizing the push-on connections between the segments 201, 202.

After all the intended segments 201, 202 have been fitted onto the rope and connected to each other, the second end of the rope 206 is also attached to the horizontally supported section for the tower 102. The section for the tower 102 can then be brought from a horizontal to a vertical position, and placed on and connected to the already partially assembled tower 102.

The system 300 enables the Scruton helix 200 to be easily and reliably used to damp vortex-excited transverse oscillations on the tower 102. The segments 201, 202 of the system 300 are realized as hollow bodies. The segments 201, 202 can be placed on the rope 206 transversely with respect to the direction of longitudinal extent 220 of the rope 206, and then rotated through 90°, for example, to positively couple each of the segments 201, 202 to the rope 206. The direction of longitudinal extent 221 of the segment 201, 202 is then co-directional with the direction of run of the rope 206. The direction of run of the rope 206 also corresponds to the direction of longitudinal extent 220 of the rope 206.

The rope channel 208 is realized between the projecting region 207 and the recessed region 214. For example, the lug 210 is arranged. During mounting, until the rope 206 reaches its final position, it must overcome a resistance, for example resulting from a gap width, between the recessed region 214 and the projecting region 207, that is less than the width of the rope 206. Once the rope 206 is in the desired final position, it easily passes through the rope channel 208, allowing the segments 201, 202 to be shifted relative to the rope 206.

The peg-shaped projection 216 is realized on one end face of the segment 201, 202. The recess 217 is realized on the other end face of the segment 201, 202. The projection 216 may have a round or other cross-section, which in particular prevents the adjacent segments from twisting relative to each other. After having been placed on the rope, the individual segments 201, 202 are pushed into each other in the longitudinal direction along the rope.

The projection 216 and the recess 217 are realized, for example, with a relatively large mutual tolerance so as to render possible the helical shape around the tower 102. This allows a lower bearing density. It is also possible to predetermine the pitch of the helix, or of the spiral shape of the Scruton helix 200, by an appropriate angling of the projection 216 and/or the recess 217 with respect to the direction of longitudinal extent 221 of the segment 201, 202.

To demount the Scruton helix 200, the individual segments 201, 202 can be pulled from the rope, for example in the longitudinal direction. It is also possible to remove individual segments in intermediate regions of the Scruton helix 200 by rotating them, relative to the rope, in the direction opposite that for mounting and then detaching them from the rope 206.

The system 300 allows rapid mounting of the Scruton helix 200. It also allows rapid demounting. The Scruton helix 200 has a low overall weight. The segments 201, 202 and the Scruton helix 200 can be produced at low cost. Overall, a simple and reliable system 300 for damping vortex-excited transverse oscillations on the wind turbine 100 during the construction phase is disclosed.

It is understood that the foregoing description is that of the preferred embodiments of the invention and that various changes and modifications may be made thereto without departing from the spirit and scope of the invention as defined in the appended claims.

LIST OF REFERENCES (PART OF
DESCRIPTION)

100 wind turbine
102 tower
103 first end of the tower
104 foundation
105 second end of the tower
106 nacelle
108 rotor
110 rotor blade
112 rotor hub
200 Scruton helix
201, 202 segment
203 segment body
204 coupling device
205 push-on device

206 rope
207 projecting region
208 rope channel
209 access region
210 lug
211 direction of main extent of the rope channel
212 direction of main extent of the access region
213 support surface
214 recessed region
216 projection
217 recess
219 angle
220 direction of longitudinal extent of the rope
221 direction of longitudinal extent of the segment body
222 first side
223 second side
224 vertical direction
225 reinforcing rib
300 system
401-404 method steps

The invention claimed is:

1. A segment for a Scruton helix, the segment comprising:
a segment body;
a coupling device on said segment body for coupling the segment to a further segment for the Scruton helix;
a push-on device on said segment body for coupling the segment to a rope; and,
   wherein said push-on device has a first projecting region defining a first recessed region and a second projecting region defining a second recessed region, wherein said first recessed region and said second recessed region are open toward different sides of the segment.

2. The segment of claim 1, wherein said push on first projecting region and said second projecting region are each configured to hook behind the rope.

3. The segment of claim 2, wherein said segment body defines a rope channel; said first projecting region and said second projecting region each partially surround said rope channel; and, said rope channel is configured to receive the rope when in a mounted state, such that the segment can be shifted along the rope.

4. The segment of claim 1, wherein said push-on device has an access region via which the segment can be applied to and removed from the rope.

5. The segment of claim 3, wherein said push-on device has an access region via which the segment can be applied to and removed from the rope; said rope channel defines a first direction of main extent; said access region defines a second direction of main extent; and, said first direction of main extent and said second direction of main extent mutually define an angle of greater than 0°.

6. The segment of claim 5, wherein said segment body has a support surface for support on a base; said push-on device has a region recessed relative to said support surface; and, said region partially forms said rope channel and partially forms said access region.

7. The segment of claim 3, wherein said push-on device has an access region via which the segment can be applied to and removed from the rope; said segment body has a support surface for support on a base; said push-on device has a region recessed relative to said support surface; and, said region partially forms said rope channel and partially forms said access region.

8. The segment of claim 1, wherein said coupling device has a projection and a recess; and, said projection is insertable into a recess of the further segment for coupling the segment to the further segment.

9. The segment of claim 1, wherein said segment body comprises a blow-molded hollow plastic body.

10. A system for a Scruton helix, the system comprising:
a rope;
a plurality of segments each having a segment body, a coupling device on said segment body for coupling the segment to a further segment for the Scruton helix, and a push-on device on said segment body for coupling the segment to said rope;
wherein each of said push-on devices has a first projecting region defining a first recessed region and a second projecting region defining a second recessed region, wherein said first recessed region and said second recessed region are open toward different sides of the segment; and,
each of said plurality of segments being configured to be coupled to said rope and coupled to each other.

11. A Scruton helix comprising the system of claim 10, said segments being coupled to said rope; and, directly adjacent ones of said plurality of segments being coupled to each other.

12. A tower for a wind turbine, comprising the Scruton helix of claim 11, the Scruton helix being arranged in the form of a spiral around the tower.

13. A method for mounting a Scruton helix, the method comprising:
providing a rope and a segment having a segment body, a coupling device on the segment body for coupling the segment to a further segment for the Scruton helix, and a push-on device on the segment body for coupling the segment to the rope;
fitting the segment onto the rope; and,
rotating the segment relative to the rope and thereby coupling the segment to the rope.

14. The method of claim 13 further comprising:
providing at least one further segment having a further segment body, a further coupling device on the further segment body for coupling the at least one further segment to another segment for the Scruton helix, and a further push-on device on the further segment body for coupling the further segment to the rope;
fitting the at least one further segment onto the rope;
rotating the at least one further segment relative to the rope and thereby coupling the at least one further segment to the rope;
shifting the segment and the at least one further segment relative to each other along the rope and thereby coupling the segment and the at least one further segment to each other.

15. The method of claim 13, wherein said rotating the segment is performed relative to a longitudinal direction of the rope.

16. The segment of claim 1, wherein said segment body defines an access region between said first projecting region and said second projecting region.

17. The segment of claim 16, wherein said access region is open on both sides of said segment body.

\* \* \* \* \*